US009532163B2

(12) United States Patent
Ito et al.

(10) Patent No.: US 9,532,163 B2
(45) Date of Patent: Dec. 27, 2016

(54) SHORT RANGE RADIO COMMUNICATION SYSTEM AND SHORT RANGE RADIO COMMUNICATION TERMINAL

(71) Applicant: DENSO CORPORATION, Kariya, Aichi-pref. (JP)

(72) Inventors: Masaya Ito, Kariya (JP); Hiroki Ukai, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/416,226

(22) PCT Filed: Jun. 20, 2013

(86) PCT No.: PCT/JP2013/003852
§ 371 (c)(1),
(2) Date: Jan. 21, 2015

(87) PCT Pub. No.: WO2014/017013
PCT Pub. Date: Jan. 30, 2014

(65) Prior Publication Data
US 2015/0208194 A1 Jul. 23, 2015

(30) Foreign Application Priority Data
Jul. 23, 2012 (JP) ................................ 2012-162588

(51) Int. Cl.
*H04B 5/00* (2006.01)
*H04W 4/00* (2009.01)
(Continued)

(52) U.S. Cl.
CPC .............. *H04W 4/008* (2013.01); *G06F 21/44* (2013.01); *H04W 4/046* (2013.01); *H04W 12/06* (2013.01);
(Continued)

(58) Field of Classification Search
CPC .......... H04W 4/046; H04W 12/06; H04B 5/00
(Continued)

(56) References Cited

U.S. PATENT DOCUMENTS 7,519,985 B2 * 4/2009 Kawamura et al. .............. 726/2
8,886,118 B2 * 11/2014 Reuss et al. ................. 455/41.1
(Continued)

FOREIGN PATENT DOCUMENTS

JP H01220060 A 9/1989
JP 2006350580 A 12/2006
(Continued)

OTHER PUBLICATIONS

International Search Report and Written Opinion (in Japanese with English Translation) for PCT/JP2013/003852, mailed Aug. 6, 2013; ISA/JP.

Primary Examiner — Angelica M. Perez
(74) Attorney, Agent, or Firm — Harness, Dickey & Pierce, P.L.C.

(57) ABSTRACT

When a predetermined cooperative application is activated, communication in a predetermined protocol used in the predetermined cooperative application is connected rapidly. A mobile communication terminal separates authentication information required for authenticating an application registered in a vehicle apparatus from a series of processing for connecting a profile to acquire from a vehicle apparatus. That is, the mobile communication terminal authenticates the application registered in the vehicle apparatus before a user performs an operation of start of the predetermined cooperative application. After the user performs the operation of start of the predetermined cooperative application by the vehicle apparatus, the authentication can be omitted, and the predetermined profile used in the predetermined cooperative application can be performed rapidly.

14 Claims, 9 Drawing Sheets

(51) Int. Cl.
*H04W 4/04* (2009.01)
*H04W 12/06* (2009.01)
*G06F 21/44* (2013.01)
*H04W 12/08* (2009.01)
*H04W 4/20* (2009.01)
*H04L 29/06* (2006.01)

(52) U.S. Cl.
CPC ............... *H04L 69/14* (2013.01); *H04W 4/20* (2013.01); *H04W 12/08* (2013.01)

(58) Field of Classification Search
USPC ....... 455/41.2, 41.3, 411, 569.2, 575.9, 345; 340/5.8; 726/2
See application file for complete search history.

(56) References Cited

U.S. PATENT DOCUMENTS

| | | | |
|---|---|---|---|
| 9,104,537 B1* | 8/2015 | Penilla | G06F 17/00 |
| 2008/0268771 A1 | 10/2008 | Masuda | |
| 2010/0138149 A1 | 6/2010 | Ohta et al. | |
| 2010/0201505 A1* | 8/2010 | Honary et al. | 340/425.5 |

FOREIGN PATENT DOCUMENTS

| JP | 2008234229 A | | 10/2008 |
|---|---|---|---|
| JP | 2008278238 A | | 11/2008 |
| JP | 2010130669 A | | 6/2010 |
| JP | 2010-199718 | * | 9/2010 |
| JP | 2010199718 A | | 9/2010 |
| JP | 2012010287 A | | 1/2012 |
| JP | 2012019473 A | | 1/2012 |

* cited by examiner

SHORT RANGE RADIO COMMUNICATION SYSTEM AND SHORT RANGE RADIO COMMUNICATION TERMINAL

CROSS REFERENCE TO RELATED APPLICATIONS

This application is a U.S. National Phase Application under 35 U.S.C. 371 of International Application No. PCT/JP2013/003852 filed on Jun. 20, 2013 and published in Japanese as WO 2014/017013 A1 on Jan. 30, 2014. This application is based on and claims the benefit of priority from Japanese Patent Application No. 2012-162588 filed Jul. 23, 2012. The entire disclosures of all of the above applications are incorporated herein by reference.

TECHNICAL FIELD

The present disclosure relates to a short range radio communication system and a short range radio communication terminal in which a first short range radio communication terminal and a second short range radio communication terminal start a predetermined cooperative application, and perform a communication in a predetermined protocol to provide a service in cooperation.

BACKGROUND ART

Up to now, there has been provided a short range radio communication system in which respective short range radio communication terminals start a predetermined cooperative application, and perform a communication in a predetermined protocol to provide a service in cooperation. For example, a mobile communication terminal that can be carried by a user, and a vehicle apparatus mounted to a vehicle perform the communication in the protocol that defines a data communication to enable a provision of services for transferring music data downloaded from a server to the mobile communication terminal to the vehicle apparatus to output the music data (for example, refer to PTL 1).

For example, when the user performs the start operation of a predetermined cooperative application in the vehicle apparatus with the results that the predetermined cooperative application starts in the vehicle apparatus, and the mobile communication terminal receives a connection request for the predetermined protocol from the vehicle apparatus. Then, the mobile communication terminal performs authentication for an application registered in the vehicle apparatus, and performs a communication in the predetermined protocol with the vehicle apparatus. Therefore, when some time is required to complete the authentication, it takes time as much to perform the communication in the predetermined protocol after the cooperative application starts in the vehicle apparatus. The mobile communication terminal may not quickly receive services by the predetermined cooperative application.

PRIOR ART DOCUMENT

Patent Document

PTL 1: JP-A-2008-278238 (corresponding to US 2008/0268771 A1)

SUMMARY OF THE INVENTION

The present disclosure has been made in view of the above, and aims to provide a short range radio communication system and a short range radio communication terminal which may rapidly perform a communication in a predetermined protocol used in a predetermined cooperative application when the cooperative application starts.

According to an embodiment of the present disclosure, in a second short range radio communication terminal, authentication information required for a first short range radio communication terminal to authenticate an application registered in the second short range radio communication terminal is stored in an authentication information storage unit. In the first short range radio communication terminal, a controller authenticates the application registered in the second short range radio communication terminal based on the authentication information acquired by the authentication information acquisition unit before a predetermined cooperative application starts in the second short range radio communication terminal.

As described above, the application registered in the second short range radio communication terminal is authenticated before the predetermined cooperative application starts in the second short range radio communication terminal. As a result, since the application registered in the second short range radio communication terminal has already been authenticated after the predetermined cooperative application has started in the second short range radio communication terminal, the authentication can be omitted. As a result, a communication in the predetermined protocol used in the predetermined cooperative application can be performed rapidly after the predetermined cooperative application has started in the second short range radio communication terminal.

BRIEF DESCRIPTION OF THE DRAWINGS

The above-described and other objects, features, and advantages of the present disclosure will become more obvious through the specific description below with reference to the accompanying figures. In the drawings.

PREFERRED EMBODIMENTS FOR CARRYING OUT THE INVENTION

First Embodiment

A description will be given of an embodiment in which a short range radio communication system according to the present disclosure is applied to a vehicle communication system having a mobile communication terminal that can be carried by a user, and a vehicle apparatus mounted to a vehicle with reference to the drawings. In the following description, a Bluetooth (registered trademark) will be referred to merely as "BT".

Figure 1:
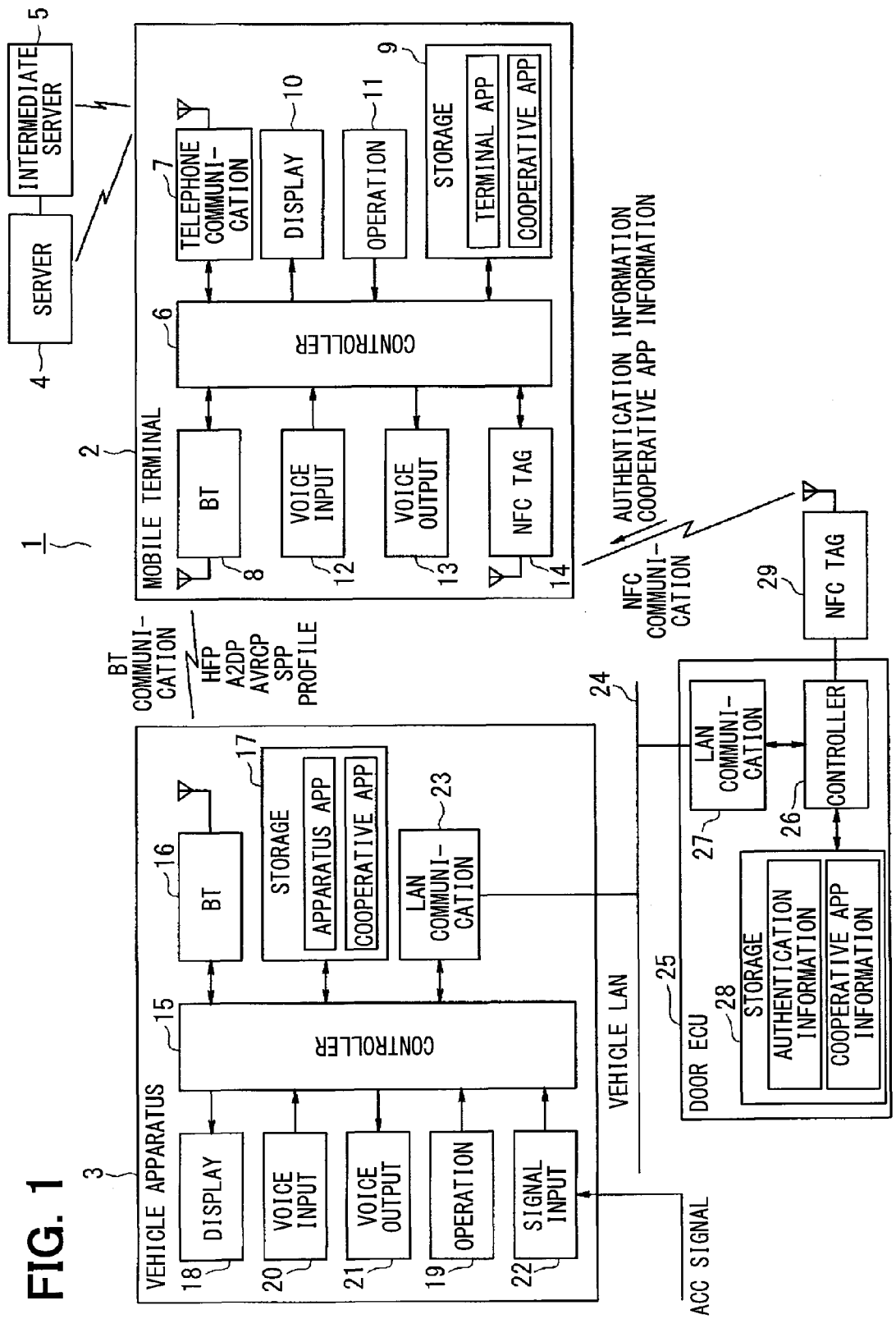
FIG. 1 is a functional block diagram illustrating an embodiment of the present disclosure.

As illustrated in FIG. 1, a vehicle communication system 1 includes a mobile communication terminal 2 and a vehicle apparatus 3. The vehicle communication system 1 corresponds to a short range radio communication system, the mobile communication terminal 2 corresponds to a first short range radio communication terminal, and the vehicle apparatus 3 corresponds to a second short range radio communication terminal and another short range radio communication terminal. In this embodiment, it is assumed that the mobile communication terminal 2 is, for example, a smart phone whose performance is improved in recent years. The mobile communication terminal 2 is connected to a server 4 or an intermediate server 5 which are managed by, for example, a content provider over a communication network to acquire a content delivered from the server 4 directly or through the intermediate server 5.

The server 4 retains various contents that realize a point of interface (POI) search service, a news distribution service, a social networking service (SNS) service, a music streaming service, or the like. Upon receiving a distribution request from the mobile communication terminal 2, the server 4 distributes an appropriate content to the mobile communication terminal 2. The intermediate server 5 has a function of converting a data format of the content distributed from the server 4 into a data format enabled to be used by the vehicle apparatus 3. A content not required to convert the data format such as music streaming data is distributed directly to the mobile communication terminal 2 from the server 4, and a content required to convert the data format such as POI data or news data is distributed to the mobile communication terminal 2 from the server 4 through the intermediate server 5.

The mobile communication terminal 2 includes a controller 6, a telephone communication unit 7, a BT communication unit 8, a storage unit 9, a display unit 10, an operation unit 11, a voice input unit 12, a voice output unit 13, and a near field communication (NFC) communication tag 14. The controller 6 corresponds to a controller or control means, or a determination unit or determination means. The NFC communication tag 14 corresponds an authentication information acquisition unit or authentication information acquisition means, or a cooperative application information acquisition unit or cooperative application information acquisition means, or a terminal side low-power radio communication unit or terminal side low-power radio communication means.

The controller 6 includes a known microcomputer having a CPU, a RAM, a ROM, and an I/O bus, or the like. The controller 6 executes a computer program stored in the ROM or the like and controls the overall operation of the mobile communication terminal 2 such as communication processing or data management processing. The telephone communication unit 7 conducts a telephone communication with the server 4 or the intermediate server 5 over the communication network. The communication network includes a facility that provides a cellular phone communication service using a known public network such as a cellular phone base station and a base station control device.

The BT communication unit 8 enables to connect a BT communication line as a near field communication line to a BT communication unit 16 of the vehicle apparatus 3, and conducts a BT communication in a connection state of the BT communication line. The BT communication unit 8 is configured to enable simultaneous connection of multiple profiles (a multi-profile connection) defined by a communication standard of the BT. Those multiple profiles mean profiles defined for respective functions, and include a hands-free profile (HFP) that defines hands-free calling, an advanced audio distribution profile (A2DP) that defines transfer of music data, an audio/video remote control profile (AVRCP) that defines a transfer of control data related to a control of the music data, a serial port profile (SPP) that defines the data communication, and a data communication profile in a predetermined OS.

The storage unit 9 has a storage area storing various data or various applications. The application means a computer program executed by the controller 6 for realizing a function of the application (providing the user with a service), and includes a terminal application by which the mobile communication terminal 2 provides the service, independently, and a cooperative application by which the mobile communication terminal 2 and the vehicle apparatus 3 provide the service in cooperation. The terminal application corresponds to, for example, an application for managing a schedule of the user. The cooperative application corresponds to, for example, an application for downloading music data from the server 4 to output the music data. The controller 6 transfers the music data downloaded from the server 4 to the vehicle apparatus 3, and outputs the music data from an audio output unit 21 of the vehicle apparatus 3 in a mode for executing the application in cooperation. The controller 6 outputs the music data downloaded from the server 4 from the voice output unit 13 in a mode for executing the application, independently. The storage unit 9 may be configured by a storage medium detachable from the mobile communication terminal 3 such as a memory card.

The display unit 10 is configured by, for example, a liquid crystal display or an organic EL display, and displays various information based on a display instruction signal input from the controller 6. The operation unit 11 includes a touch panel which is touch switches formed on a display screen of the display unit 10, and various operation keys including switches mechanically disposed around or in the vicinity of the display unit 10. The operation unit 11 outputs an operation detection signal to the controller 6 in response to user's operation of the operation keys. The controller 6 analyzes the operation detection signal input from the operation unit 11 to identify operation content of the user. The controller 6 notifies the vehicle apparatus 3 of the identified operation content by the BT communication when the BT communication is enabled between the BT communication unit 8 and the BT communication unit 16 of the vehicle apparatus 3.

When the mobile communication terminal 2 operates as a stand-alone telephone, that is, when the mobile communication terminal 2 is in a stand-alone call state, the voice input unit 12 receives a voice generated by the user as a transmitted voice. The transmitted voice is transmitted from the telephone communication unit 7 to a call partner over the communication network. When the mobile communication terminal 2 operates as a stand-alone telephone, that is, when the mobile communication terminal 2 is in a stand-alone call state, the voice output unit 13 outputs the voice received by the telephone communication unit 7 from the call partner through the communication network as a received voice. The stand-alone call state is a state that is not a hands-free call state.

The NFC communication tag 14 is connectable to an NFC communication tag 29 connected to a door ECU 25 through a NFC communication line, and performs an NFC communication in a connection state of the NFC communication line. The NFC communication is one of the international standards for a short range communication for performing a data communication at a short distance of several tens of (cm) using radio waves in a frequency band of 13.56 (MHz).

The vehicle apparatus 3 includes a controller 15, a BT communication unit 16, a storage unit 17, a display unit 18, an operation unit 19, a voice input unit 20, the voice output unit 21, a signal input unit 22, and a vehicle LAN communication unit 23.

The controller 15 includes a known microcomputer having a CPU, a RAM, a ROM, an I/O bus, or the like. The controller 15 executes a computer program stored in the ROM or the like and controls the overall operation of the vehicle apparatus 3 such as communication processing or data management processing. The BT communication unit 16 enables to connect a BT communication line as a short range communication line to the BT communication unit 8 of the mobile communication terminal 2, and conducts a BT communication in a connection state of the BT communication line. The BT communication unit 16 is configured to enable simultaneous connection of multiple profiles defined by the communication standard of the BT.

The storage unit 17 has a storage area storing various data and various applications. The application means a computer program executed by the controller 15 for realizing a function of the application, and includes a device application by which the vehicle apparatus 3 provides the service, independently, and a cooperative application by which the vehicle apparatus 3 and the mobile communication terminal 2 provide the service in cooperation. The apparatus application is, for example, an application for outputting the music data registered in the vehicle apparatus 3. The cooperative application is, for example, an application for outputting the music data downloaded from the server 4 to the mobile communication terminal 2, and transferred from the mobile communication terminal 2.

The display unit 18 is configured by, for example, a liquid crystal display or an organic EL display, and displays various information based on a display instruction signal input from the controller 15. The operation unit 19 includes a touch panel which is touch switches formed on a display screen of the display unit 18, and various operation keys including switches mechanically disposed around or in the vicinity of the display unit 18. The operation unit 19 outputs an operation detection signal to the controller 15 in response to user's operation of the operation keys. The controller 15 analyzes the operation detection signal input from the operation unit 19 to identify operation content of the user. The controller 15 notifies the mobile communication terminal 2 of the identified operation content by the BT communication when the BT communication is enabled between the BT communication unit 16 and the BT communication unit 8 of the mobile communication terminal 2.

The voice input unit 20 inputs the voice generated by the user as a transmitted voice when the mobile communication terminal 2 and the vehicle apparatus 3 are in the hands-free calling state. The transmitted voice is transferred from the BT communication unit 16 to the BT communication unit 8 of the mobile communication terminal 2, and transmitted from the telephone communication unit 7 to the call partner through the communication network. When the mobile communication terminal 2 and the vehicle apparatus 3 are in the hands-free calling state, the voice output unit 21 outputs the voice received by the telephone communication unit 7 from the call partner through the communication network, and transferred to the BT communication unit 16 from the BT communication unit 8 of the mobile communication terminal 2 as a received voice.

The signal input unit 22 is connected to an ACC (accessory) switch (not shown) mounted to the vehicle, and outputs an ACC signal to the controller 15 upon receiving the ACC signal from the ACC switch. The controller 15 controls on/off operation of a power supply circuit (not shown) based on on/off states of the ACC signal input from the signal input unit 22. The controller 15 turns on the power supply circuit at timing when the ACC signal changes from off to on, starts the power supply to the respective functional blocks from the power supply circuit to start the vehicle apparatus 3, and turns off the power supply circuit at timing when the ACC signal changes from on to off, and stops the power supply to a partial function block from the power supply circuit to stop the vehicle apparatus 3. The controller 15 maintains to start a specific functional block when the vehicle apparatus 3 stops. The specific functional block corresponds to a functional block except for the partial functional block.

The vehicle LAN communication unit 23 is connected to a vehicle LAN 24 mounted to the vehicle, and performs a data communication with various electronic control units (ECU) mounted to the vehicle or various sensors over a vehicle LAN 24. The ECUs include an ECU of a power train system such as an engine ECU performing an engine control, or an ECU of a body system such as an air conditioning ECU performing air conditioning control. The door ECU 25 performing door lock control is connected as one of the body system ECU.

The door ECU 25 includes a controller 26, a vehicle LAN communication unit 27, and a storage unit 28. The storage unit 28 corresponds to an authentication information storage unit or authentication information storage means, or a cooperative application information storage unit or cooperative application information storage means. The controller 26 includes a known microcomputer having a CPU, a RAM, a ROM, an I/O bus, or the like. The controller 26 executes a computer program stored in the ROM or the like to control the overall operation of the door ECU 25 such as communication processing or door lock control processing. The vehicle LAN communication unit 27 is connected to a vehicle LAN 24, and performs a data communication with the vehicle apparatus 3, various ECUs, or various sensors through the vehicle LAN 24.

The storage unit 28 is configured to store apparatus information, authentication information, cooperative application information, or the like which enable to perform a communication connection through the BT communication. In this embodiment, the apparatus information includes specific information of the vehicle apparatus 3, and if multiple BT communication connectable apparatuses are existed within the vehicle, the apparatus information includes specific information of the various apparatuses. The authentication information corresponds to information indicating an application (including the cooperative application and the apparatus application) stored (registered) in the storage unit 17 of the vehicle apparatus 3, and information referred between the apparatuses in a communication connection of the BT communication. Specifically, the mobile communication terminal 2 having Android (registered trademark) as a platform refers to a universally unique identifier (UUID) as the authentication information. The mobile communication terminal 2 specifies the application registered in the vehicle apparatus 3 which is a communication partner of the BT communication referring to the authentication information. The mobile communication terminal 2 determines whether to enable the provision of a service in cooperation with the vehicle apparatus 3. The controller 15 transmits the information indicative of the application stored in the storage unit 17 to the door ECU 25 from the vehicle LAN communication unit 23. The storage unit 28 of the door ECU 25 enables to store the authentication information. When the user conducts adding operation or deleting operation of the application through the operation unit 19, the controller 15 transmits the content of addition or deletion of the application to the door ECU 25 from the vehicle LAN communication unit 23, the content of the addition or deletion of the application on the authentication information one by one is reflected. The latest authentication information is stored. The cooperative application information is information that enables to identify a specific cooperative application among the cooperative applications stored in the storage unit 17 of the vehicle apparatus 3. Specifically, the cooperative application information is information that enables to identify the cooperative application which had started immediately before an ACC switch turns off at the previous time.

The NFC communication tag 29 is connected to the door ECU 25, and disposed in the vicinity of a door knob of a driver's seat. The NFC communication tag 29 corresponds to a vehicle side low-power radio communication unit or vehicle side low-power radio communication means. The NFC communication tag 29 is connectable to the NFC communication tag 14 of the mobile communication terminal 2 through an NFC communication line, and performs an NFC communication in a connection state of the NFC communication line. The user holds the mobile communication terminal 2 over the door knob of the driver's seat, and the NFC communication tag 14 of the mobile communication terminal 2 and the NFC communication tag 29 of the vehicle connect the NFC communication line to perform the NFC communication. The door ECU 25 and the NFC communication tag 29 perform a standby operation even when the ACC switch is off, and a start of the NFC communication by the NFC communication tag 29 is detected by the controller 26.

In the vehicle communication system 1, the mobile communication terminal 2 and the vehicle apparatus 3 can be operated independently when the mobile communication terminal 2 and the vehicle apparatus 3 do not connect the BT communication line and the BT communication connection is not established. On the other hand, the mobile communication terminal 2 and the vehicle apparatus 3 can operate, independently and in addition, can operate in cooperation with each other when the mobile communication terminal 2 and the vehicle apparatus 3 connect the BT communication line and the BT communication connection is established. The vehicle apparatus 3 may be a hands-free device, a navigation device having a hands-free function, or the like. The navigation device having the hands-free function has known navigation functions such as a function of identifying a current position of the vehicle, a function of reading map data from a recording medium, a function of setting a destination, a function of map-matching the current position of the vehicle with the map data, and a function of searching a route from the current position of the vehicle to the destination. The navigation device may be an installation type apparatus fixedly fitted to the vehicle, or may be a portable apparatus that is detachably attached to the vehicle.

The operation of the configuration will be described with reference to FIGS. 2 to 10. It is assumed that an initial registration for setting an HFP, an A2DP, an SPP, and a data communication profile in a predetermined OS is set between the vehicle apparatus 3 and the mobile communication terminal 2 as a target of the automatic BT connection has already been completed. When the HFP, the A2DP, and the data communication profile in the predetermined OS are set as the target of the automatic BT connection, even when the cooperative application does not start, the vehicle apparatus 3 and the mobile communication terminal 2 are connectable to each other as a trigger to connect the BT communication line. However, in the data communication profile in a predetermined OS, the session is not connected. The SPP is set as the target of the automatic BT connection, and connected as a trigger to start the cooperative application using the SPP. As examples, in the respective situations of:

(1) when the user approaches the vehicle, and holds the mobile communication terminal 2 over the door knob of the driver's seat in order to get on the vehicle, (2) when the user gets on the vehicle to turn on the ACC switch, and (3) when the user turns off the ACC switch in order to get off the vehicle, the operation of the mobile communication terminal 2, the vehicle apparatus 3, and the door ECU 25 will be sequentially described. Also, in this example, a case in which the mobile communication terminal 2 is a terminal having Android as the platform will be described.

(1) a case when the user approaches the vehicle, and holds the mobile communication terminal 2 over the door knob of the driver's seat in order to get on the vehicle.

Figure 2:
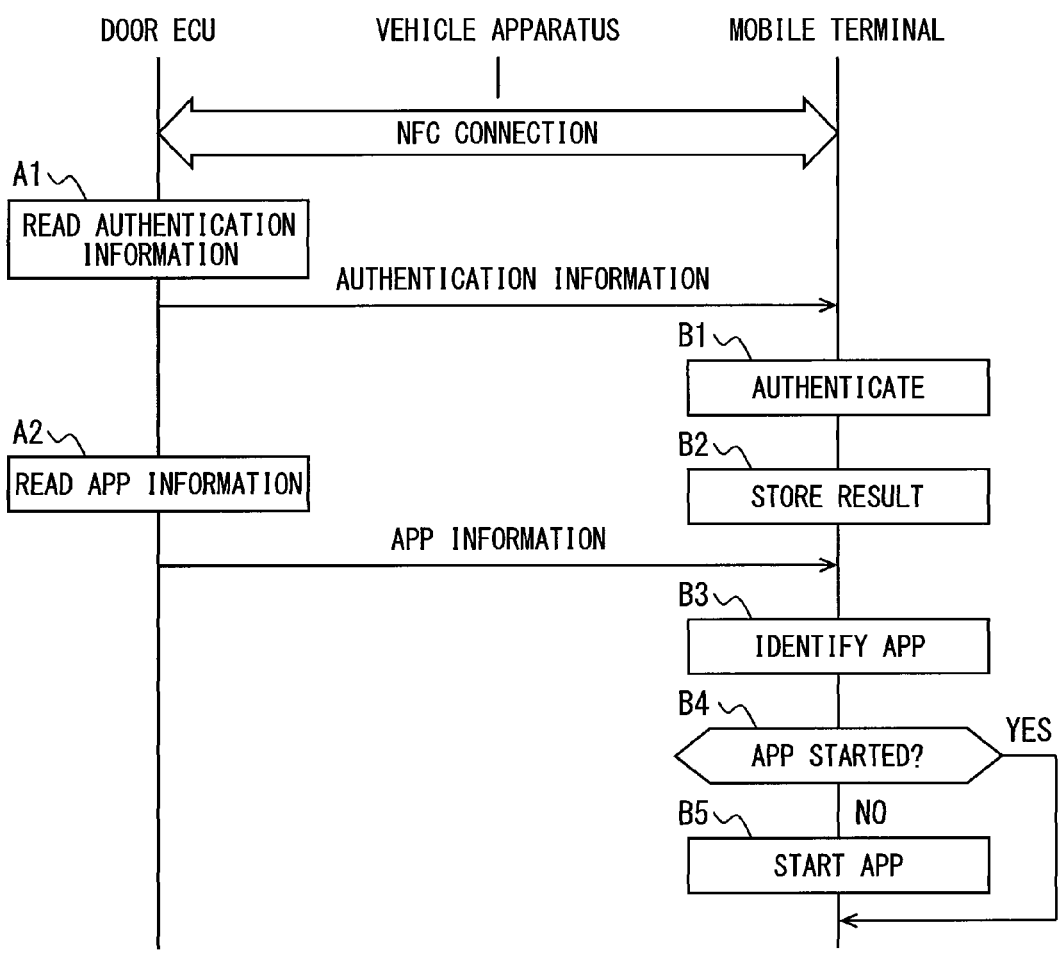
FIG. 2 is a sequence diagram of the embodiment of the present disclosure.

When the user approaches the vehicle, and holds the mobile communication terminal 2 over the door knob of the driver's seat in order to get on the vehicle, and the NFC communication tag 14 of the mobile communication terminal 2 and the NFC communication tag 29 on the door ECU 25 come closer to each other at a NFC communicable distance (fall within a communication range of the NFC communication), as illustrated in FIG. 2, the NFC communication tag 14 and the NFC communication tag 29 connect the NFC communication line to start the NFC communication. In this case, with the connection of the NFC communication line, the NFC communication tag 14 outputs a connection notification signal indicative of the connection of the NFC communication line to the controller 6. With the connection of the NFC communication line, the NFC communication tag 29 outputs the connection notification signal indicative of the connection of the NFC communication line to the controller 26 of the door ECU 25.

In the door ECU 25, upon receiving the connection notification signal from the NFC communication tag 29, the controller 26 reads the authentication information stored in the storage unit 28 (step A1), and transmits the read authentication information to the NFC communication tag 14 from the NFC communication tag 29 through the NFC communication. When the NFC communication tag 29 and the NFC communication tag 14 connect the NFC communication line, when the controller 26 identifies a model of the mobile communication terminal 2 that is a communication partner, and determines that the mobile communication terminal 2 that is a communication partner is a terminal having Android as the platform, the controller 26 transmits an UUID as the authentication information from the NFC communication tag 29 to the NFC communication tag 14 through the NFC communication.

In the mobile communication terminal 2, when receiving the connection notification signal from the NFC communication tag 14, the controller 6 waits until the authentication information is received by the NFC communication tag 14. When the authentication information is received by the NFC communication tag 14, the controller 6 authenticates the application registered in the vehicle apparatus 3 based on the received authentication information (step B1). When the UUID is received as the authentication information, the controller 6 identifies the application registered in the vehicle apparatus 3 based on the received UUID. In this case, since the UUID is allocated to each of the applications, individually, when the multiple applications are registered in the vehicle apparatus 3, the controller 6 identifies the multiple applications in correspondence with the multiple UUIDs. When a large number of applications are registered in the vehicle apparatus 3, since a large number of UUIDs are targeted, a long time may be required to complete the authentication. The controller 6 stores the results of authenticating the applications registered in the vehicle apparatus 3 (step B2).

In the door ECU 25, after the controller 26 has transmitted the authentication information from the NFC communication tag 29 to the NFC communication tag 14 through the NFC communication, the controller 26 reads the cooperative application information stored in the storage unit 28 (step A2), and transmits the read cooperative application information from the NFC communication tag 29 to the NFC communication tag 14 through the NFC communication.

In the mobile communication terminal 2, after the authentication information has been received by the NFC communication tag 14, the controller 6 waits until the NFC communication tag 14 receives the cooperative application information. When the NFC communication tag 14 receives the cooperative application information, the controller 6 identifies the cooperative application based on the received cooperative application information (step B3). The controller 6 determines whether the identified cooperative application is starting (step B4). When the controller 6 determines that the identified cooperative application does not yet start (step B4: NO), the controller 6 starts the identified cooperative application (step B5). When the controller 6 determines that the identified cooperative application is now starting (step B4: YES), the controller 6 maintains the start of the cooperative application. In this case, the controller 6 may start the identified cooperative application by any one of foreground and background when the controller 6 has a configuration having the foreground and the background so as to start the multiple applications at the same time.

According to a series of processing, before the user gets on the vehicle, the mobile communication terminal 2 performs the NFC communication with the vehicle (a door ECU 25) to authenticate the application registered in the vehicle apparatus 3, and starts the cooperative application identified by the cooperative application information stored in the vehicle apparatus 3.

(2) a case when the user gets on the vehicle to turn on the ACC switch

Figure 3:
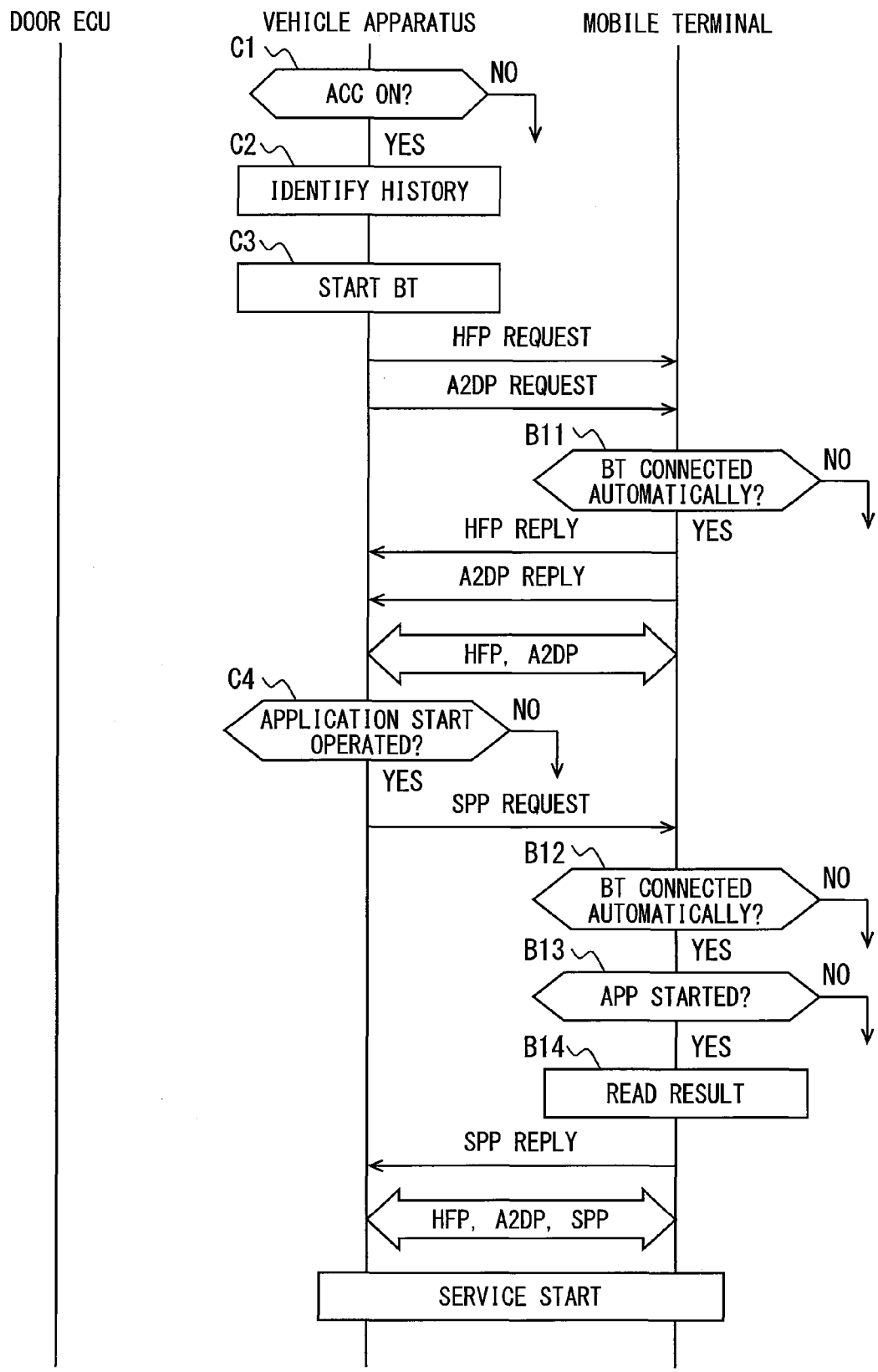
FIG. 3 is another sequence diagram of the embodiment of the present disclosure.

When the user gets on the vehicle and performs the switching operation of the ACC switch from off to on, the ACC signal input from the ACC switch to the signal input unit 22 switches from off to on. In the vehicle apparatus 3, as illustrated in FIG. 3, when the controller 15 switches the ACC signal input to the signal input unit 22 from the ACC signal from off to on, and determines that the ACC switch turns on (step C1: YES), the controller 15 identifies a past connection history, that is, a connection history of the BT communication unit 16 immediately before the ACC switch turns off at the previous time (step C2), and starts the connection of the BT connection line based on the past connection history (step C3). In this case, for example, when it is assumed that the HFP and the A2DP are connected between the vehicle apparatus 3 and the mobile communication terminal 2 as the past connection history, the controller 15 connects the BT communication line between the BT communication unit 16 and the BT communication unit 8 of the mobile communication terminal 2, transmits an HFP connection request from the BT communication unit 16 to the BT communication unit 8, and transmits an A2DP connection request from the BT communication unit 16 to the BT communication unit 8.

In the mobile communication terminal 2, when the HFP connection request is received by the BT communication unit 8 and the A2DP connection request is received by the BT communication unit 8, the controller 6 determines whether the automatic BT connection (setting for permitting the connection of the profile) of the HFP and the A2DP is set to on (step B11). When the controller 6 determines that the automatic BT connection of the HFP and the A2DP is set to on (step B11: YES), the controller 6 permits the HFP connection request and the A2DP connection request from the vehicle apparatus 3, transmits the HFP connection reply from the BT communication unit 8 to the BT communication unit 16, and transmits the A2DP connection reply from the BT communication unit 8 to the BT communication unit 16.

In the vehicle apparatus 3, when the BT communication unit 16 receives the HFP connection reply and the A2DP connection reply, the controller 15 connects the HFP and the A2DP between the BT communication unit 16 and the BT communication unit 8.

A description will be given of a case in which the user conducts the operation of starting a predetermined cooperative application using the SPP (corresponding to a predetermined protocol) through the operation unit 19. When the controller 15 receives an operation detection signal from the operation unit 19 and determines that the user conducts the start operation of a predetermined cooperative application through the operation unit 19 (step C4: YES), the controller 15 transmits the SPP connection request from the BT communication unit 16 to the BT communication unit 8 so as to connect the SPP used in the cooperative application that the start operation is conducted. In this case, the controller 15 transmits information, which enables to identify the predetermined cooperative application whose start operation is conducted, together with the SPP connection request from the BT communication unit 16 to the BT communication unit 8.

Figure 4:
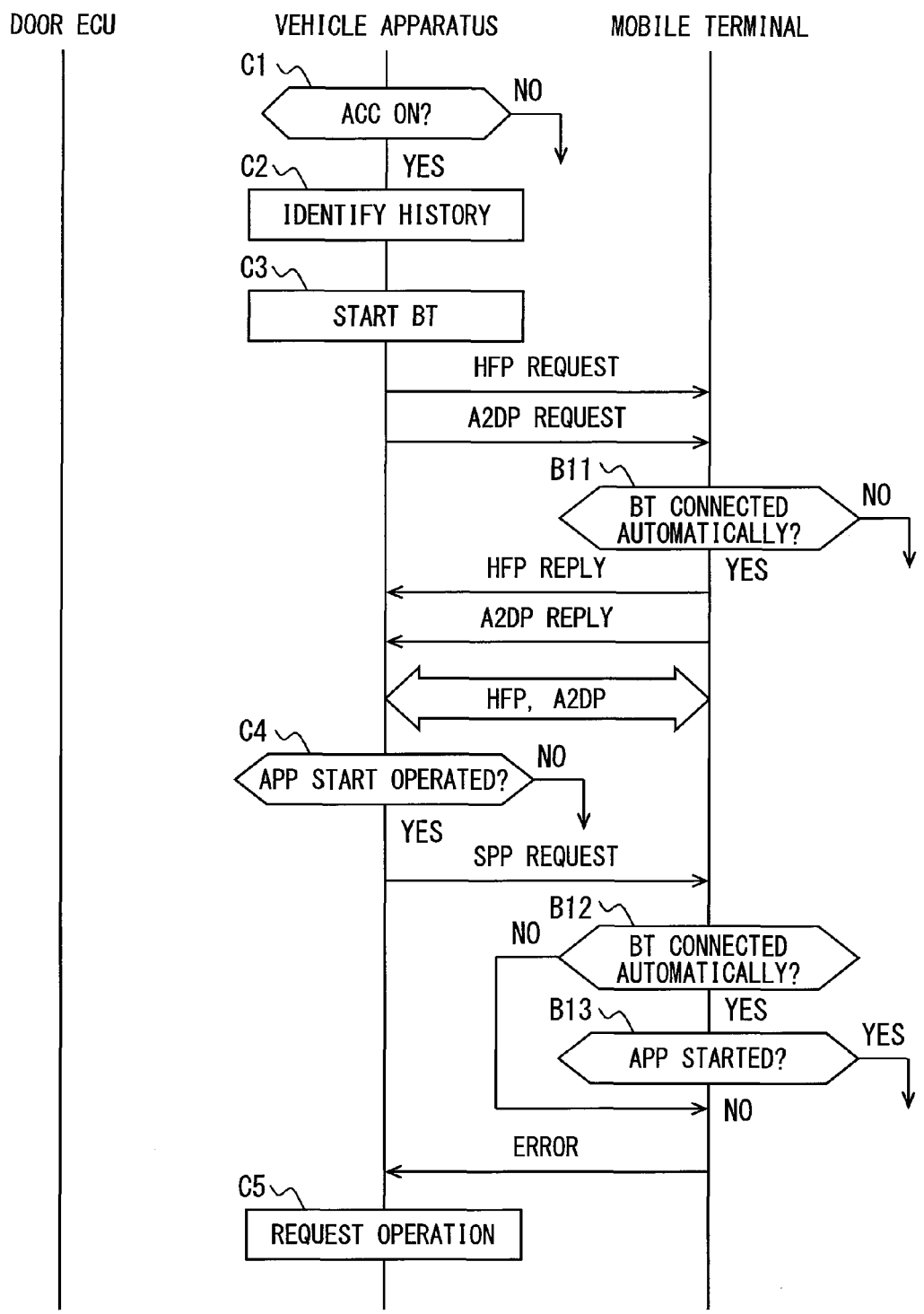
FIG. 4 is another sequence diagram of the embodiment of the present disclosure.

In the mobile communication terminal 2, when the BT communication unit 8 receives the SPP connection request, the controller 6 determines whether the automatic BT connection of the SPP is set to on (step B12). When the controller 6 determines that the automatic BT connection of the SPP is set to on (step B12: YES), the controller 6 determines whether the predetermined cooperative application whose start operation is conducted is starting (step B13). When the controller 6 determines that the predetermined cooperative application whose start operation is conducted is starting, (step B13: YES), the controller 6 does not authenticate the application registered in the vehicle apparatus 3 at this time, reads the authentication result stored previously (at the time when the above NFC communication is performed) (step B14), and transmits the SPP connection reply from the BT communication unit 8 to the BT communication unit 16. As illustrated in FIG. 4, when the controller 6 determines that the automatic BT connection of the SPP is not set to on (step B12: NO), and determines that the predetermined cooperative application is not starting (step B13: NO), the controller 6 transmits an error notification from the BT communication unit 8 to the BT communication unit 16.

In the vehicle apparatus 3, when the BT communication unit 16 receives the error notification, the controller 15 displays a screen informing that the predetermined cooperative application does not start in the mobile communication terminal 2 on the display unit 18, and urges the user to conduct the operation of starting the predetermined cooperative application through the mobile communication terminal 2 (step C5).

When the predetermined cooperative application whose start operation is conducted by the user is identical with the cooperative application identified by the cooperative application information transmitted to the mobile communication terminal 2 from the vehicle through the NFC communication before the start operation conducted by the user, since the predetermined cooperative application has already started in the mobile communication terminal 2, the user does not need to perform the operation of starting the predetermined cooperative application in the mobile communication terminal 2. When the predetermined cooperative application whose start operation is conducted by the user is different from the cooperative application identified by the cooperative application information transmitted to the mobile communication terminal 2 from the vehicle through the NFC communication before the start operation conducted by the user, since the predetermined cooperative application does not start in the mobile communication terminal 2, the user needs to perform the operation of starting the predetermined cooperative application in the mobile communication terminal 2.

Figure 9:
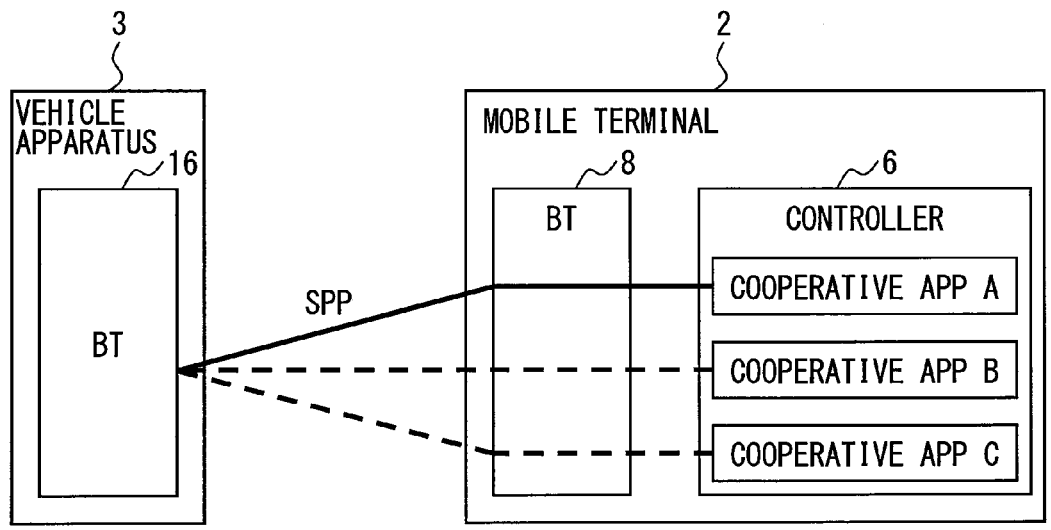
FIG. 9 is a diagram illustrating a mode in which a cooperative application is connected to SPP.

In the vehicle apparatus 3, when the SPP connection reply is received by the BT communication unit 16, the controller 15 connects the SPP in addition to the HFP and the A2DP between the BT communication unit 16 and the BT communication unit 8. In this case, in the mobile communication terminal 2, as illustrated in FIG. 9, when the multiple cooperative applications (cooperative applications A to C in FIG. 9) start, the controller 6 sets a connection destination of the SPP to an appropriate cooperative application (a cooperative application A in FIG. 9) to connect the appropriate cooperative application to the SPP. After the operation of starting the predetermined cooperative application has been conducted in the vehicle apparatus 3, the vehicle apparatus 3 and the mobile communication terminal 2 connect the SPP to enable the service by the predetermined cooperative application to start. For example, it is supposed that the operation of starting the cooperative application, which outputs music data downloaded from the server 4 to the mobile communication terminal 2 from the vehicle apparatus 3, as the predetermined cooperative application is performed in the vehicle apparatus 3, the music data downloaded from the server 4 to the mobile communication terminal 2 is transferred from the mobile communication terminal 2 to the vehicle apparatus 3 by the SPP, and output from the vehicle apparatus 3.

Figure 8:
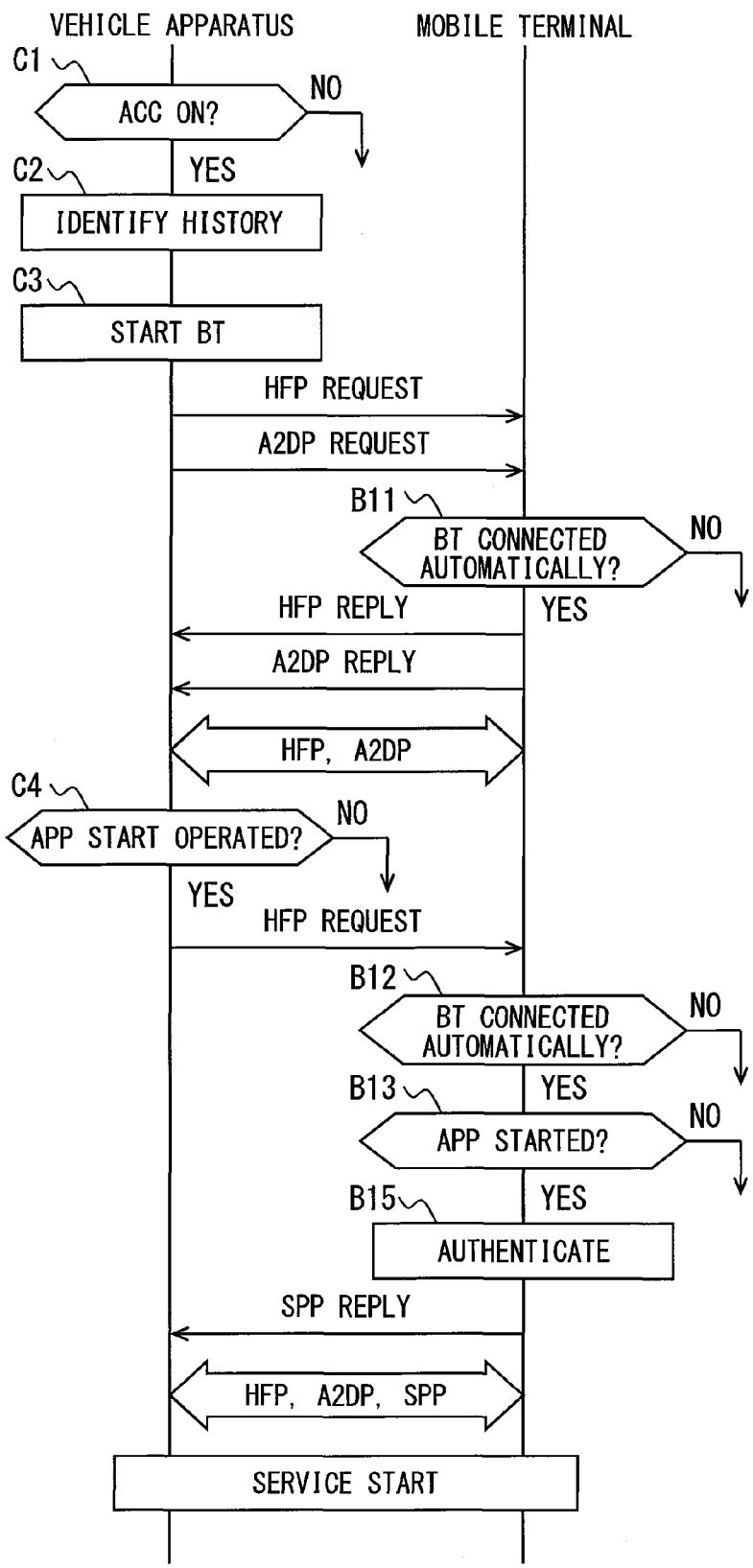
FIG. 8 is another sequence diagram of the embodiment of the present disclosure.

With the series of processing described above, the mobile communication terminal 2 authenticates the application registered in the vehicle apparatus 3 before the user conducts the operation of starting the predetermined cooperative application in the vehicle apparatus 3. After the user has performed the operation of starting the predetermined cooperative application in the vehicle apparatus 3, the authentication of the application registered in the vehicle apparatus 3 is omitted and the SPP is rapidly connected between the mobile communication terminal 2 and the vehicle apparatus 3. As illustrated in FIG. 8, when the application registered in the vehicle apparatus 3 is to be authenticated after the user has performed the operation of starting the predetermined cooperative application in the vehicle apparatus 3 (step B15), and it takes some time to complete the authentication, a time since the user performs the operation of starting the predetermined cooperative application in the vehicle apparatus 3 until the SPP (communication in the predetermined protocol) is connected between the mobile communication terminal 2 and the vehicle apparatus 3 is delayed by a time required to complete the authentication. In this embodiment, based on a technical concept that the authentication of the application registered in the vehicle apparatus 3 is separated from the series of processing for connecting the SPP, the authentication is performed before the user performs the operation of starting the predetermined cooperative application in the vehicle apparatus 3. The time from when the user performs the operation of starting the predetermined cooperative application in the vehicle apparatus 3 to when the SPP is connected is shortened.

Figure 5:
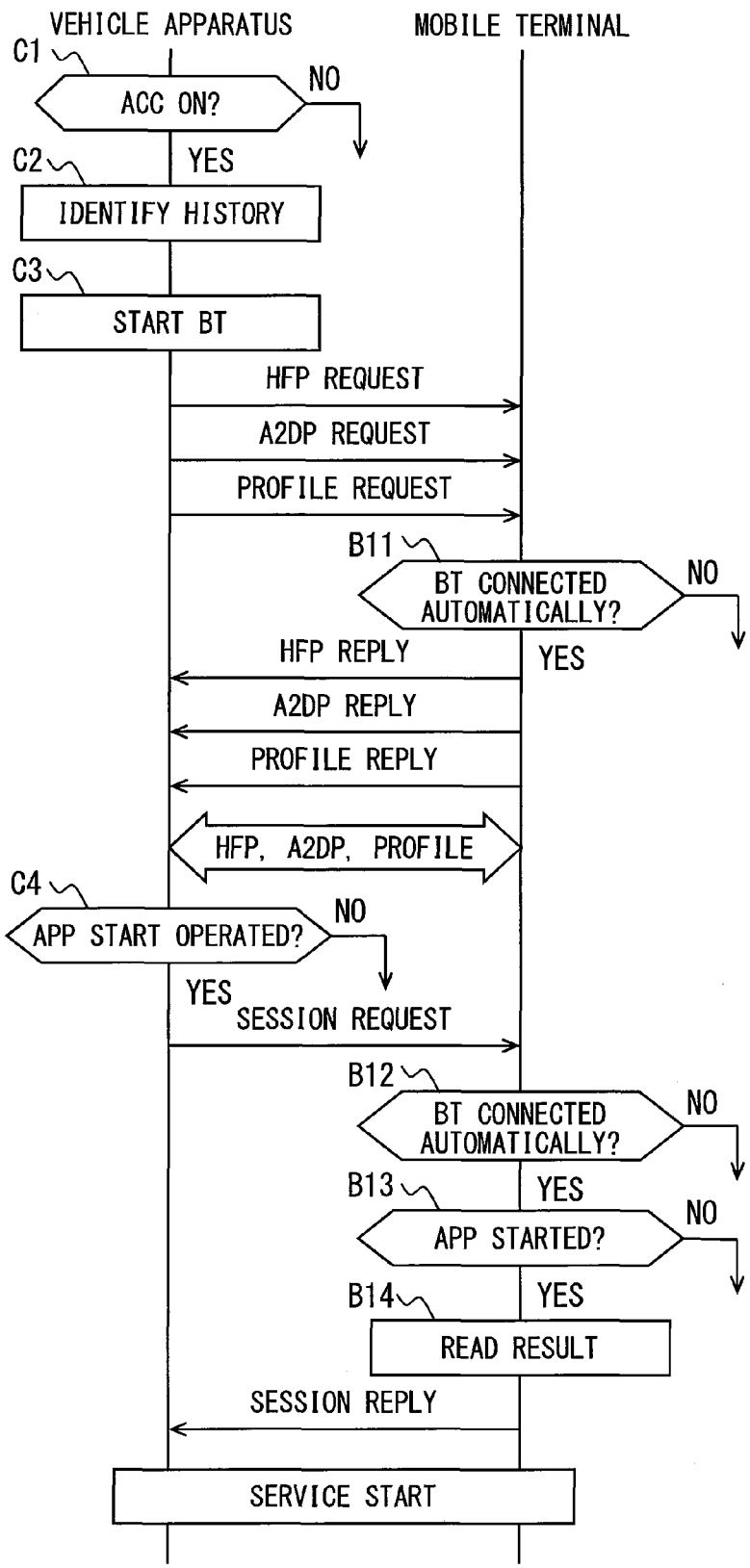
FIG. 5 is another sequence diagram of the embodiment of the present disclosure.
Figure 6:
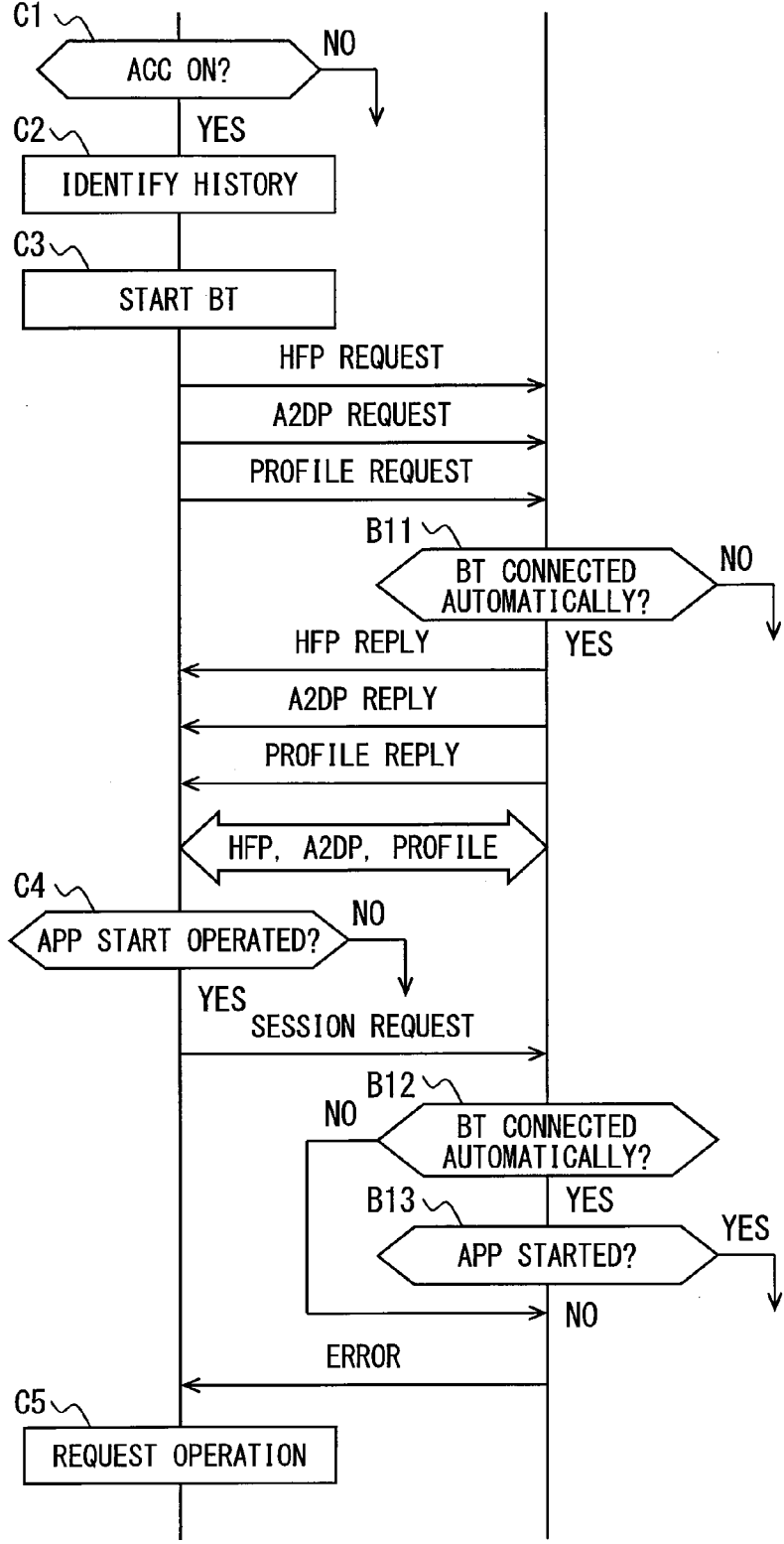
FIG. 6 is another sequence diagram of the embodiment of the present disclosure.
Figure 10:
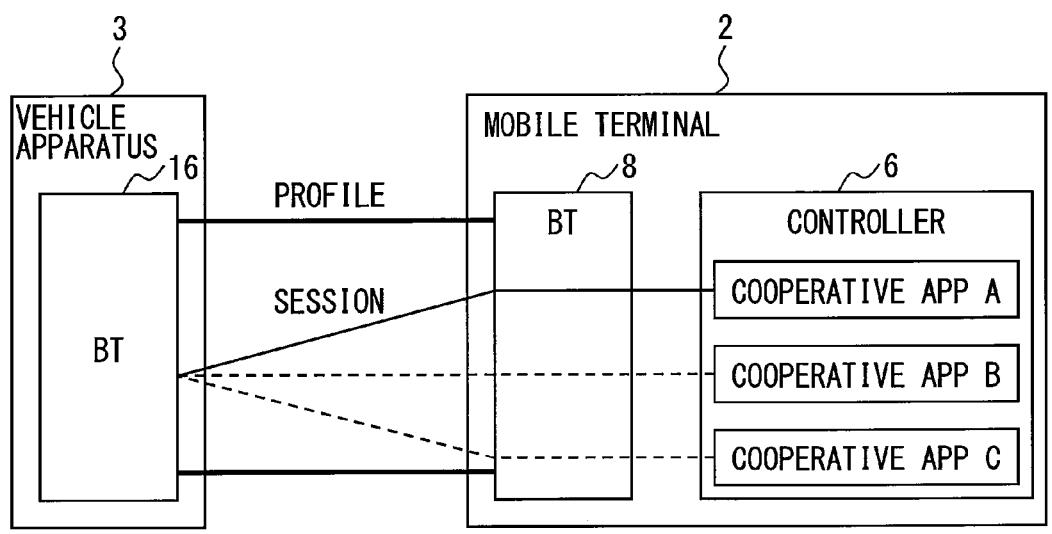
FIG. 10 is a diagram illustrating a mode in which a cooperative application is connected to a session of a data communication profile in a predetermined OS.

When the mobile communication terminal 2 is a terminal having the predetermined OS as the platform, in the vehicle apparatus 3, as illustrated in FIGS. 5 and 6, the controller 15 connects the HFP and the A2DP between the BT communication unit 16 and the BT communication unit 8 while connecting the data communication profile, but the data communication profile is not connected in the session. Then, if the controller 15 determines that the operation of starting the predetermined cooperative application is performed in the operation unit 19 (step C4: YES), the controller 15 transmits a session connection request from the BT communication unit 16 to the BT communication unit 8 so as to connect the session of the data communication profile which is a profile used in the cooperative application whose start operation is conducted. In this case, in the mobile communication terminal 2, as illustrated in FIG. 10, if the multiple cooperative applications (cooperative applications A to C in FIG. 10) start, the controller 6 sets a connection destination of the session of the data communication profile to an appropriate cooperative application (cooperative application A in FIG. 10), to thereby connect the appropriate cooperative application to the session of the data communication profile.

Figure 7:
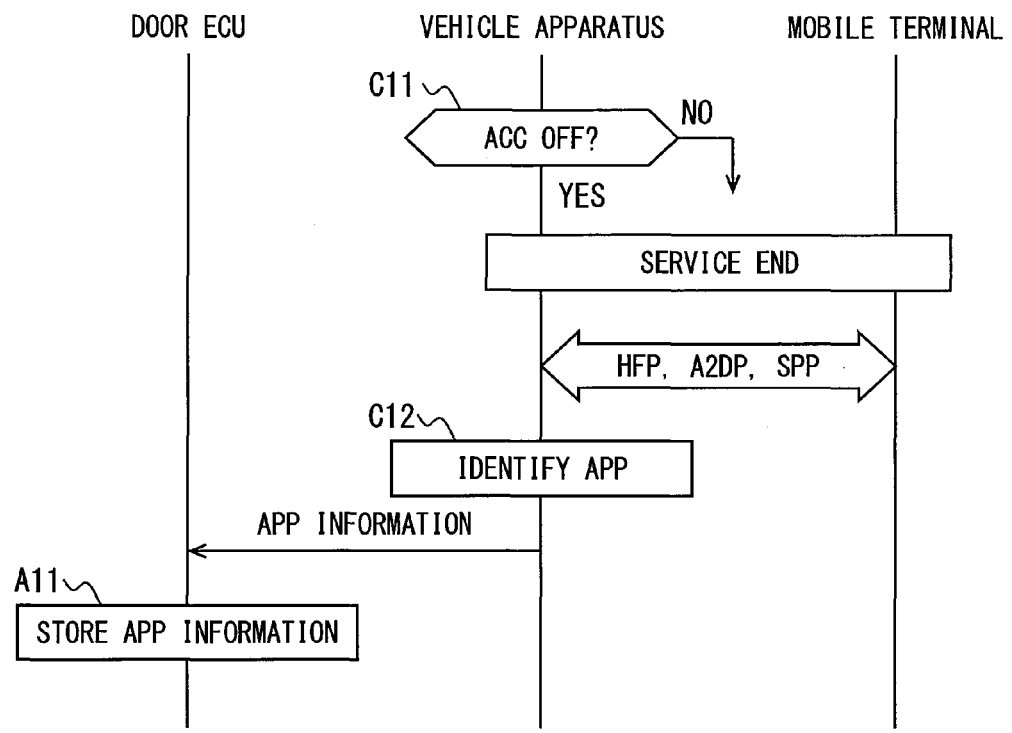
FIG. 7 is another sequence diagram of the embodiment of the present disclosure.

(3) a case when the user turns off the ACC switch in order to get off the vehicle When the user performs the switching operation of the ACC switch from on to off so as to get off the vehicle, the ACC signal input from the ACC switch to the signal input unit 22 switches from on to off. In the vehicle apparatus 3, as illustrated in FIG. 7, the controller 15 switches the ACC signal input to the signal input unit 22 from the ACC switch from on to off to determine that the ACC switch turns off (step C11: YES). The controller 15 completes the service by the cooperative application, disconnects the HFP, the A2DP, and the SPP connected between the BT communication unit 16 and the BT communication unit 8, and identifies the completed cooperative application (that had started immediately before the ACC switch turns off) (step C12). Then, the controller 15 transmits the cooperative application information that enables to identify the identified cooperative application from the vehicle LAN communication unit 23 to the door ECU 25.

In the door ECU 25, when the vehicle LAN communication unit 27 receives the cooperative application information, the controller 26 stores the received cooperative application information in the storage unit 28 (step A11). The controller 26 reads the cooperative application information stored in the storage unit 28 by turning off the ACC switch at this time when the ACC switch turns on at the next time, and transmits the cooperative application information from the NFC communication tag 29 to the NFC communication tag 14 of the mobile communication terminal 2.

As described above, according to the present embodiment, in the mobile communication terminal 2 providing a service in cooperation with the vehicle apparatus 3, the authentication information required to authenticate the application registered in the vehicle apparatus 3 is separated from the series of processing for connecting the profile, and acquired from the vehicle apparatus 3. The application registered in the vehicle apparatus 3 is authenticated before the user performs the operation of starting the predetermined cooperative application in the vehicle apparatus 3. Accordingly, after the user performs the operation of starting the predetermined cooperative application in the vehicle apparatus 3, it may be possible that the authentication is omitted when the authentication has been performed in advance. The time from when the user performs the operation of starting the predetermined cooperative application in the vehicle apparatus 3 to when the SPP used in the predetermined cooperative application is connected may be shortened.

The cooperative application information that enables to identify the cooperative application which had started immediately before the ACC switch turns off at the previous time is stored in the storage unit 28 of the door ECU 25. When the application registered in the vehicle apparatus 3 is authenticated, the cooperative application identified by the cooperative application information starts in the mobile communication terminal 2. Accordingly, when the cooperative application which had started immediately before the ACC switch turns off at the previous time starts as the predetermined cooperative application in the vehicle apparatus 3, it may be possible that the predetermined cooperative application starts in the mobile communication terminal 2 before the predetermined cooperative application starts in the vehicle apparatus 3. Accordingly, it may be possible that the service by the predetermined cooperative application is rapidly received without allowing the user to perform the operation of starting the predetermined cooperative application in the mobile communication terminal 2 after the SPP has been connected.

The present disclosure is not limited to only the above embodiments, but may be modified or expanded as follows. The present disclosure is not limited to the vehicle communication system that performs the BT communication between the mobile communication terminal 2 and the vehicle apparatus 3, but may be applied to a communication system that performs the BT communication between the mobile communication terminal 2, and an apparatus that is installed, for example, within a building, which is irrelevant to the vehicle.

The application registered in the vehicle apparatus 3 may be authenticated at any time before the predetermined cooperative application starts in the vehicle apparatus 3 (before the operation of connecting the profile used in the predetermined cooperative application is performed), and the authentication may be performed, for example, at the timing when the ACC switch switches from off to on, or at the timing to complete the connection of another profile such as the HFP or the A2DP. In this case, there is no need to perform the NFC communication before the user gets on the vehicle, and it is sufficient to perform the NFC communication after the user gets on the vehicle. Therefore, the NFC communication tag 29 on the vehicle may be installed in a portion (for example, a cradle within a vehicle interior) other than the vicinity of the door knob of the driver's seat.

The cooperative application information that enables to identify the cooperative application which had started immediately before the ACC switch turns off is not limited to be stored, but the cooperative application information that enables to identify the cooperative application identified by the user may be stored. Accordingly, if the user designates the cooperative application used when the user gets on the vehicle at the next time when the user gets off the vehicle, the cooperative application designated when the user gets on at the next time may be started in the mobile communication terminal 2.

The present disclosure is not limited to the configuration in which, in the vehicle apparatus 3, the predetermined cooperative application starts on a condition that the user performs the operation of starting the predetermined cooperative application, but for example, with the use of a timer function, the predetermined cooperative application may start on a condition that a timer reaches a predetermined time.

In the mobile communication terminal 2, when it is determined that the predetermined cooperative application is not starting (step B13: NO), a screen for promoting the operation of the starting the predetermined cooperative application is displayed on the display unit 10 for urging the user to perform the operation of starting the predetermined cooperative application. Alternatively, the predetermined cooperative application may automatically start. According to this configuration, even when the cooperative application different from the cooperative application which had started immediately before the ACC switch turns off at the previous time starts as the predetermined cooperative application in the vehicle apparatus 3, it may be possible that a labor of performing the operation of starting the predetermined cooperative application in the mobile communication terminal 2 is omitted.

The predetermined cooperative application is not limited to the cooperative application for outputting the music data downloaded from the server 4 to the mobile communication terminal 2, from the vehicle apparatus 3. The predetermined protocol is not limited to the SPP, but may be applied to another cooperative application and another profile.

According to the present disclosure, in a short range radio communication system in which a first short range radio communication terminal (2) and a second short range radio communication terminal (3) start a predetermined cooperative application and perform a communication in a predetermined protocol to provide a service in cooperation, the short range radio communication system includes: an authentication information storage unit (28) that is disposed to the second short range radio communication terminal (3) and stores authentication information required for the first short range radio communication terminal (2) to authenticate an application registered in the second short range radio communication terminal (3); an authentication information acquisition unit (14) that is disposed to the first short range radio communication terminal (2) and acquires the authentication information stored in the authentication information storage unit (28); and a controller (6) that is disposed to the first short range radio communication terminal (2) and authenticates the application registered in the second short range radio communication terminal (3) based on the authentication information acquired by the authentication information acquisition unit (14) before the predetermined cooperative application starts in the second short range radio communication terminal (3).

Further, according to the present disclosure, there is provided a short range radio communication terminal that starts the predetermined cooperative application, and connects a predetermined protocol to another short range radio communication terminal (3) to provide a service in cooperation, the short range radio communication terminal including: an authentication information acquisition unit (14) that acquires authentication information stored in the another short range radio communication terminal (3) required for authenticating the application registered in the another short range radio communication terminal (3); and a controller (6) that authenticates the application registered in the another short range radio communication terminal (3) based on the authentication information acquired by the authentication information acquisition unit (14) before the predetermined cooperative application starts in the another short range radio communication terminal (3).

The application registered in the second short range radio communication terminal is authenticated before the predetermined cooperative application starts in the second short range radio communication terminal. Since the application registered in the second short range radio communication terminal has already been authenticated after the predetermined cooperative application has started in the second short range radio communication terminal, it may be possible to omit the authentication. Accordingly, it may be possible that a communication in the predetermined protocol used in the predetermined cooperative application is performed rapidly after the predetermined cooperative application has started in the second short range radio communication terminal.

Further, according to the short range radio communication system and the short range radio communication terminal in the present disclosure, the cooperative application information storage unit may store the cooperative application information indicative of the cooperative application on the second short range radio communication terminal. On the first short range radio communication terminal, when the cooperative application information is acquired by the cooperative application information acquisition unit, the controller may start the cooperative application identified by the cooperative application information after performing the authentication.

Accordingly, when the cooperative application identified by the cooperative application information stored on the second short range radio communication terminal is identical with the predetermined cooperative application that starts in the second short range radio communication terminal, the predetermined cooperative application enables to start in the first short range radio communication terminal before the predetermined cooperative application starts in the second short range radio communication terminal. It may be possible that the service by the predetermined cooperative application is rapidly received without allowing the user to perform the operation of starting the predetermined cooperative application in the first short range radio communication terminal after the communication in the predetermined protocol used in the predetermined cooperative application has been connected.

The embodiments and the configurations of the short range radio communication system and the short range radio communication terminal according to the present disclosure have been exemplified, but the embodiments and the configurations according to the present disclosure are not limited to the respective embodiments and the respective configurations described above. The embodiments and the configurations obtained by appropriately combining the respective technical elements disclosed in the different embodiments and configurations together also fall within the scope of the embodiments and the configurations according to the present disclosure.

What is claimed is:
1. A short range radio communication system comprising:
a first short range radio communication terminal;
a second short range radio communication terminal that is mounted to a vehicle; and
a vehicle-side low-power radio communication unit that is mounted to the vehicle and performs low-power radio communication,
wherein:
the first short range radio communication terminal and the second short range radio communication terminal start a predetermined cooperative application and perform communication with each other in a predetermined protocol, providing a service in cooperation,
the second short range radio communication terminal includes:
an authentication information storage unit that stores universally unique identifier UUID required for the first short range radio communication terminal to authenticate an application registered in the second short range radio communication terminal; and
a cooperative application information storage unit that stores cooperative application information that identifies a cooperative application,
the first short range radio communication terminal includes:
an authentication information acquisition unit that acquires the UUID stored in the authentication information storage unit;
a controller that receives the UUID from the authentication information acquisition unit before the second short range radio communication terminal is supplied with power, and performs authentication to identify the application registered in the second short range radio communication terminal by referring to the UUID that has been received;
a cooperative application information acquisition unit that acquires the cooperative application information from the cooperative application information storage unit;
a determination unit that determines whether a user tries to enter the vehicle; and
a terminal-side low-power radio communication unit that performs the low-power radio communication,
wherein:
the vehicle-side low-power radio communication unit and the terminal-side low-power radio communication unit wirelessly communicate with each other without supplying electric power to the second short range radio communication terminal,
the determination unit determines that the user tries to enter the vehicle in a case where the determination unit detects that the terminal-side low-power radio communication unit performs the low-power radio communication with the vehicle-side low-power radio communication unit,
the controller performs the authentication when the determination unit determines that the user tries to enter the vehicle, and
the controller starts in advance the cooperative application identified by the cooperative application information acquired by the cooperative application information acquisition unit after performing the authentication and before the cooperative application is started through the second short range radio communication terminal by the user.

2. The short range radio communication system according to claim 1, wherein
the first short range radio communication terminal is a mobile communication terminal that is carried by the user, and
the second short range radio communication terminal is a vehicle apparatus mounted to the vehicle.

3. The short range radio communication system according to claim 2, wherein
the vehicle side low-power radio communication unit is located in a vicinity of a door knob of the vehicle.

4. The short range radio communication system according to claim 1, wherein
the controller starts the predetermined cooperative application when the predetermined cooperative application does not start in the first short range radio communication terminal after the predetermined cooperative application starts in the second short range radio communication terminal.

5. The short range radio communication system according to claim 1, wherein
the controller sets a connection destination of the predetermined protocol to the predetermined cooperative application and performs the communication in the predetermined protocol.

6. The short range radio communication system according to claim 1, wherein
the controller sets a connection destination of a session of the predetermined protocol to the predetermined cooperative application and performs the communication in the predetermined protocol.

7. The short range radio communication system according to claim 1, wherein:
the authentication information storage unit stores the authentication information when the second short range radio communication terminal turns off; and
the authentication information stored in the authentication information storage unit of the second short range radio communication terminal is read out and transmitted to the authentication information acquisition unit associated with the first short range radio communication terminal before the second short range radio communication terminal is supplied with power.

8. The short range radio communication system according to claim 1, wherein:
the UUID corresponds to information showing an application stored in the second short range radio communication terminal, wherein the application includes a cooperative application and an apparatus application,
the cooperative application information identifies a particular cooperative application which was executed immediately before an ACC switch of the vehicle was turned off at a previous time, and
the second short range radio communication terminal is supplied with power when the ACC switch turns on.

9. A short range radio communication system comprising:
a mobile communication terminal that is carried by a user and corresponds to a first short range radio communication terminal;
a vehicle apparatus that is mounted to a vehicle and corresponds to a second short range radio communication terminal; and
a vehicle-side low-power radio communication unit that is mounted to the vehicle and performs low-power radio communication;
wherein:
the mobile communication terminal and the vehicle apparatus start a predetermined cooperative application and perform communication with each other in a predetermined protocol, providing a service in cooperation,
the vehicle apparatus includes:
an authentication information storage unit that stores universally unique identifier UUID required for the mobile communication terminal to authenticate an application registered in the vehicle apparatus,
the mobile communication terminal includes:
an authentication information acquisition unit that acquires the UUID stored in the authentication information storage unit;
a controller that receives the UUID from the authentication information acquisition unit before the vehicle apparatus is supplied with power, and performs authentication to identify the application registered in the vehicle apparatus by referring to the UUID that has been received;
a determination unit that determines whether the user tries to enter the vehicle; and
a terminal-side low-power radio communication unit that performs the low-power radio communication,
wherein:
the vehicle-side low-power radio communication unit and the terminal-side low-power radio communication unit wirelessly communicate with each other without supplying electric power to the vehicle apparatus,
the determination unit determines that the user tries to enter the vehicle in a case where the determination unit detects that the terminal-side low-power radio communication unit performs the low-power radio communication with the vehicle-side low-power radio communication unit, and
the controller performs the authentication when the determination unit determines that the user tries to enter the vehicle.

10. The short range radio communication system according to claim 9, wherein
the controller starts the predetermined cooperative application when the predetermined cooperative application does not start in the mobile communication terminal after the predetermined cooperative application starts in the vehicle apparatus.

11. The short range radio communication system according to claim 9, wherein
the controller sets a connection destination of the predetermined protocol to the predetermined cooperative application and performs the communication in the predetermined protocol.

12. The short range radio communication system according to claim 9, wherein
the controller sets a connection destination of a session of the predetermined protocol to the predetermined cooperative application and performs the communication in the predetermined protocol.

13. A short range radio communication terminal that starts a predetermined cooperative application and connects a predetermined protocol to an other short range radio communication terminal to provide a service in cooperation, the short range radio communication terminal comprising:
an authentication information acquisition unit that acquires universally unique identifier UUID which is stored in the other short range radio communication terminal and which is required for authentication of an application registered in the other short range radio communication terminal;

a controller that receives the UUID from the authentication information acquisition unit before the other short range radio communication terminal is supplied with power, and performs the authentication to identify the application registered in the other short range radio communication terminal by referring to the UUID that has been received;

a cooperative application information acquisition unit that acquires cooperative application information from the other short range radio communication terminal;

a determination unit that determines whether a user tries to enter a vehicle; and a terminal-side low-power radio communication unit that performs low-power radio communication, wherein:

the terminal-side low-power radio communication unit performs radio communication with an other low-power radio communication unit in the other short range radio communication terminal without supplying electric power to the other short range radio communication terminal, the determination unit determines that the user tries to enter the vehicle in a case where the determination unit detects that the terminal-side low-power radio communication unit performs the low-power radio communication with the other low-power radio communication unit, the controller performs the authentication when the determination unit determines that the user tries to enter the vehicle, and the controller starts in advance the cooperative application identified by the cooperative application information acquired by the cooperative application information acquisition unit after performing the authentication and before the cooperative application is started through the other short range radio communication terminal by the user.

14. A short range radio communication terminal that starts a predetermined cooperative application and connects a predetermined protocol to an other short range radio communication terminal to provide a service in cooperation, the short range radio communication terminal comprising:

an authentication information acquisition unit that acquires universally unique identifier UUID which is stored in the other short range radio communication terminal and which is required for authentication of an application registered in the other short range radio communication terminal;

a controller that receives the UUID from the authentication information acquisition unit before the other short range radio communication terminal is supplied with power, and performs the authentication to identify the application registered in the other short range radio communication terminal by referring to the UUID;

a determination unit that determines whether a user tries to enter a vehicle; and a terminal-side low-power radio communication unit that performs low-power radio communication, wherein:

the short range radio communication terminal is a mobile communication terminal that is carried by a user, the other short range radio communication terminal is a vehicle apparatus mounted to the vehicle, the terminal-side low-power radio communication unit performs radio communication with an other low-power radio communication unit in the other short range radio communication terminal without supplying electric power to the other short range radio communication terminal, the determination unit determines that the user tries to enter the vehicle in a case where the determination unit detects that the terminal-side low-power radio communication unit performs the low-power radio communication with the other low-power radio communication unit, and the controller performs the authentication when the determination unit determines that the user tries to enter the vehicle.

* * * * *